United States Patent
Lee et al.

(10) Patent No.: US 8,331,481 B2
(45) Date of Patent: Dec. 11, 2012

(54) METHOD FOR CHANNEL STATE FEEDBACK BY QUANTIZATION OF TIME-DOMAIN COEFFICIENTS

(75) Inventors: Seung Joon Lee, Daejeon (KR); Dong Seung Kwon, Daejeon (KR); Giuseppe Caire, South Pasadena, CA (US); Hooman Shirani-Mehr, Los Angeles, CA (US)

(73) Assignees: Samsung Electronics Co., Ltd., Suwon-si (KR); Electronics and Telecommunications Research Institute, Daejeon (KR); University of Southern California, Los Angeles ( * ) Notice: Subject to any disclaimer, the term of this patent is extended or adjusted under 35 U.S.C. 154(b) by 968 days.

(21) Appl. No.: 12/274,046

(22) Filed: Nov. 19, 2008

(65) Prior Publication Data

US 2009/0185607 A1    Jul. 23, 2009

Related U.S. Application Data

(60) Provisional application No. 61/022,565, filed on Jan. 22, 2008.

(30) Foreign Application Priority Data

Jul. 30, 2008 (KR) .................. 10-2008-0074533

(51) Int. Cl.
 *H04L 27/00* (2006.01)
(52) U.S. Cl. ........................................ 375/295
(58) Field of Classification Search .................. 375/295, 375/316, 346
See application file for complete search history.

(56) References Cited

U.S. PATENT DOCUMENTS

| | | | |
|---|---|---|---|
| 2007/0211823 A1 | 9/2007 | Mazzarese et al. | |
| 2007/0299662 A1* | 12/2007 | Kim et al. | 704/230 |
| 2009/0016425 A1* | 1/2009 | Hui et al. | 375/240 |

FOREIGN PATENT DOCUMENTS

| | | |
|---|---|---|
| JP | 2008-011517 A | 1/2008 |
| KR | 10-2005-0044018 A | 5/2005 |
| KR | 10-2007-0085128 A | 8/2007 |
| KR | 10-2007-0098460 A | 10/2007 |

OTHER PUBLICATIONS

Nihar Jindal, MIMO Broadcast Channels With Finite-Rate Feedback, Nov. 2006, pp. 5045-5060, vol. 52, No. 11, IEEE.

* cited by examiner

*Primary Examiner* — Kevin M Burd
(74) *Attorney, Agent, or Firm* — Jefferson IP Law, LLP

(57) ABSTRACT

The present invention relates to a channel state transmission method using time domain coefficient quantization. A terminal measures channel information in the time domain and transmits it to a base station. In this instance, a multipath frequency selective fading channel is displayed in a tapped delay line format configured with a per-path path delay value and a path gain in the time domain, differentiates a quantization level for each path gain for more efficient transmission, quantizes the same, and transmits it to a transmitter. Therefore, while the amount of bandwidths required for transmitting state information from the terminal to the base station is reduced, the base station can efficiently acquire channel state information on the entire bandwidths. Also, the base station transmits signals to many terminals through beamforming by using the acquired reliable channel state information, thereby increasing the terminal's signal receiving performance.

12 Claims, 4 Drawing Sheets

US 8,331,481 B2

METHOD FOR CHANNEL STATE FEEDBACK BY QUANTIZATION OF TIME-DOMAIN COEFFICIENTS

CROSS-REFERENCE TO RELATED APPLICATION

This application claims priority to and the benefit of U.S. provisional application No. 61/022,565, filed with the United States Patent and Trademark Office on Jan. 22, 2008, as well as the benefit of Korean Patent Application No. 10-2008-0074533, filed with the Korean Intellectual Property Office on Jul. 30, 2008, the entire contents of which are incorporated herein by reference.

BACKGROUND OF THE INVENTION (a) Field of the Invention

The present invention relates to a channel state feedback method by quantizing time domain channel coefficients.

(b) Description of the Related Art

In a multiple-user multiple-antenna communication system, communication between a plurality of terminals and base stations is simultaneously performed at the same time and same frequency through a spatially identified signal. In this instance, a terminal must not be interfered with by a signal transmitted to another user during communication through a single receiving antenna. For this, a base station performs an appropriate beamforming process based on channel information with the terminal.

In detail, one part of information to be known by the base station in the multiple-user multiple-antenna communication system is channel information with the terminal to be simultaneously communicated by the base station. In the frequency division duplex (FDD) system, the terminal measures channel information between the base station and the terminal and transmits a measured channel coefficient (a channel value) to the base station so that the base station knows the channel information.

Considering the existing multiple-user multiple-antenna communication system, the terminal transmits a quantized direction of a channel vector for the base station and the terminal and a corresponding signal-to-noise ratio (SNR) value to the base station. Here, the channel vector indicates a channel state between the base station and the terminal. The channel state is expressed as a channel vector assuming that the base station has a plurality of transmitting antennas and the terminal has a single receiving antenna.

The base station selects a plurality of appropriate terminals from among many terminals in consideration of the channel state, and transmits data to the selected terminals. In this instance, what is to be considered when the terminals are selected is selection of the terminals having less interference between the quantized directions of the channel vectors of the selected terminals and having a great SNR.

The orthogonal frequency division multiplexing (OFDM) system is widely used for transmitting signals in the current communication system. However, the above-noted scheme is difficult to apply to the OFDM system because it is proposed for a single-carrier system.

This is because channel state transmission in the frequency domain from the terminal to the base station is not performed by all subcarriers, but several subcarriers are sampled by considering the limited feedback resource and the channel state is then transmitted on the sampled subcarrier in the OFDM system. The base station uses the channel state on the sampled subcarrier, and performs an interpolation process for checking state information of the subcarrier receiving no channel state value to know the channel state on the subcarrier.

However, the above-noted existing method transmits not the channel vector but the quantized value of the channel vector direction to the base station. Therefore, it is difficult to know directions of other subcarriers by using the quantized direction of the channel vector on a specific sampled subcarrier.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for a terminal to transmit channel state information used by a base station to the base station.

An exemplary embodiment of the present invention provides a method for a terminal to transmit channel state information with a base station to the base station, including: measuring a channel state in the time domain with the base station; quantizing the measured channel state in the time domain; and including the quantized channel state information in a reference signal and transmitting the same to the base station.

Another embodiment of the present invention provides a method for a base station receiving feedback information from a terminal to acquire a channel state from the base station to the terminal, including: transmitting a reference signal to the terminal through a multipath communication channel; receiving quantized channel state information in the time domain from the terminal; and checking a channel state in the frequency domain from the received channel state information in the time domain.

Accordingly, the base station can efficiently acquire channel state information for the entire bandwidth while reducing the amount of bandwidth that is needed for the terminal to transmit state information to the base station.

Further, the signal receiving performance of the terminal is increased since the base station transmits signals to many terminals through beamforming by using the acquired reliable channel state information.

DETAILED DESCRIPTION OF THE EMBODIMENTS

Figure 1:
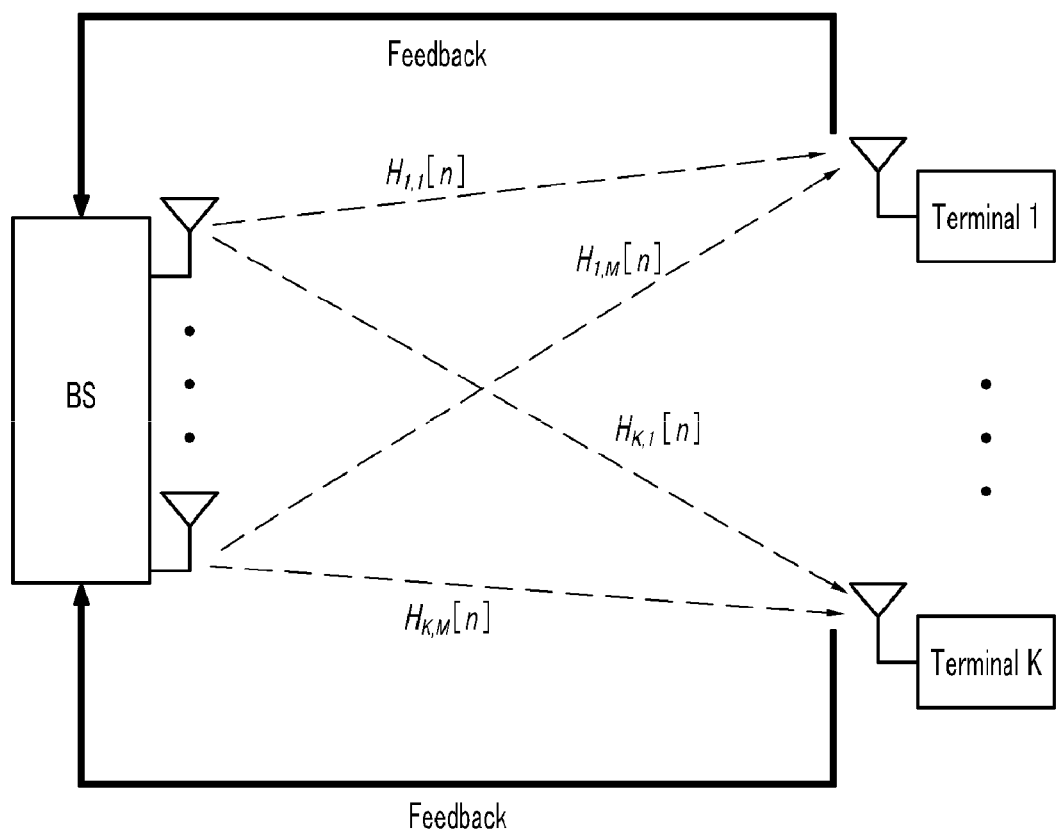
FIG. 1 shows a configuration diagram of a multiple-user multiple-antenna communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

In the specification, a terminal may indicate a mobile station (MS), a mobile terminal (MT), a subscriber station (SS), a portable subscriber station (PSS), user equipment (UE), and an access terminal (AT), and may include partial or entire functions of the MS, MT, SS, PSS, UE, and AT.

In the specification, a base station (BS) may indicate an access point (AP), a radio access station (RAS), a nodeB (Node B), a base transceiver station (BTS), and a mobile multihop relay (MMR) BS, and may include partial or entire functions of the AP, RAS, Node B, BTS, and MMR-BS.

A channel state transmission method according to an exemplary embodiment of the present invention will now be described with reference to accompanying drawings.

FIG. 1 shows a configuration diagram of a multiple-user multiple-antenna communication system according to an exemplary embodiment of the present invention.

No restriction is applied to a transmitting part and a receiving part, and for ease of description, the transmitting part will be exemplified as a base station and the receiving part will be exemplified as a terminal. The base station will be exemplified to have multiple transmitting antennas. The number of receiving antennas of the terminal is not limited, but for convenience of description, the case of the terminal having a single receiving antenna will be exemplified. An OFDM system for transmitting and mapping data in the frequency domain will now be considered.

As shown in FIG. 1, $H_{k,m}[n]$ is a channel coefficient in the frequency domain for the subcarrier n between the terminal k and the base station antenna m.

A discrete time baseband model of a multipath channel between the base station antenna m and the terminal k can be expressed by a tapped-delay line with the length L as Equation 1.

$$h_{k,m}=[h_{k,m}[0], h_{k,m}[1], \ldots, h_{k,m}[L-1]]^T \quad \text{(Equation 1)}$$

Here, $h_{k,m}[l]$ is a channel coefficient value of a path corresponding to a path delay l, and is a random variable. Its variance is given as $\sigma_l^2$. A frequency domain channel vector between the base station antenna m and the terminal k will be defined as Equation 2.

$$H_{k,m}=[H_{k,m}[0], H_{k,m}[1], \ldots, H_{k,m}[N-1]]^T \quad \text{(Equation 2)}$$

Here, N is the number of subcarriers.

The relationship between the frequency domain channel vector of Equation 2 and the time domain channel vector of Equation 1 is expressed in Equation 3.

$$H_{k,m} = \sqrt{N}\, F \begin{bmatrix} h_{k,m} \\ 0_{(N-L)\times 1} \end{bmatrix} \quad \text{(Equation 3)}$$

Here, F is an N×N discrete Fourier transform matrix, and can be expressed as Equation 4.

$$F = \frac{1}{\sqrt{N}} \begin{bmatrix} 1 & 1 & 1 & \ldots & 1 \\ 1 & W_N & W_N^2 & \ldots & W_N^{N-1} \\ \vdots & \vdots & \vdots & \ddots & \vdots \\ 1 & W_N^{N-1} & W_N^{2(N-1)} & \ldots & W_N^{(N-1)^2} \end{bmatrix} \quad \text{(Equation 4)}$$

In this instance, $W_N$ is defined as $W_N = e^{-j2\pi i N}$.

A channel state transmitting method according to an exemplary embodiment of the present invention will be described as follows.

A plurality of terminals provided in the region covered by the base station respectively measure the channel state between the base station and the terminal. An example of a channel state measuring method is a method for measuring a channel state by using a pilot symbol used for estimating the channel. Here, since the channel state measuring method is known to a person skilled in the art, no detailed description will be provided in the exemplary embodiment of the present invention. Also, a reference signal is defined as a signal that is transmitted to the base station after a pilot symbol is included in the signal, and it is not restricted thereto.

The terminal measures the channel state, quantizes a real number value and an imaginary number value of the time domain channel coefficient, and transmits the quantized values to the base station.

For ease of notation, a measured channel state and a real channel have the same variables, assuming that the channel state measured by the base station and the real channel are the same. When attempting to display a variable by considering the measurement error of the measured channel state, the quantized channel state variable is displayed with another variable.

Here, when the time domain channel coefficient is quantized, efficiency of channel state transmission can be increased by allocating a different number of quantization bits according to a statistic characteristic of a channel coefficient of each path instead of quantizing the time domain channel coefficient for each channel path by using the same bit.

For example, when an allowable maximum distortion value is given in advance, the number of quantization bits for each channel path can be set by applying reverse water filling to L independent Gaussian sources. In detail, a distortion value (or a first distortion value) is defined as an average of the square of a quantization error.

That is, when a quantization value of the time domain channel coefficient $h_{k,m}[l]$, (l=0, ..., L-1) is set to be $\hat{h}_{k,m}[l]$, the distortion value, that is, the first distortion value, is defined as $$\sum_{l=0}^{L-1} E\left[\left|h_{k,m}[l] - \hat{h}_{k,m}[l]\right|^2\right].$$

Here, the distortion value is directly influenced by the system performance. When the maximum distortion value allowed for quantizing the channel coefficient is set to be D, a rate distortion function for the L independent Gaussian sources is expressed as Equation 5.

$$R(D) = \sum_{l=0}^{L-1} \left[ \log \frac{\sigma_l^2}{\gamma} \right]_+ \quad \text{(Equation 5)}$$

Here, γ is determined by Equation 6.

$$\sum_{l=0}^{L-1} \min\{\gamma, \sigma_l^2\} = D \quad \text{(Equation 6)}$$

Here, [ ]+ in Equation 5 is defined as $[x]+=\max\{0, x\}$.

R(D) of Equation 5 represents the minimum value of entire quantization bits that are required when the distortion value becomes less than the allowable maximum distortion value D. Particularly, the number of bits to be allocated for quantizing the channel coefficient of the l-th path is expressed in Equation 7.

$$B_l = \left[ \log \frac{\sigma_l^2}{\gamma} \right]_+ \quad \text{(Equation 7)}$$

If $\gamma \geq \sigma_l^2$, then $B_l = 0$. Accordingly, more quantization bits are allocated for quantizing the channel coefficient having a great variance.

The number of quantization bits that are needed for quantizing the channel coefficient for each path has been described. A method for establishing a quantization region will now be described.

A uniform scalar quantization method will now be described. The number of quantization regions for quantizing a real value or an imaginary value of the channel coefficient for each path is given as $Q_l = 2^{\lfloor B_l/2 \rfloor}$. Here, $\lfloor x \rfloor$ is an integer that is not greater than x.

When a uniform quantization interval is set to be $\Delta_l (>0)$, a quantization boundary value is given as expressed in Equation 8, and middle values of the respective regions are given as Equation 9.

$$0, \pm\Delta_l, \pm 2\Delta_l, \ldots, \pm(Q_l-2)\Delta_l/2 \quad \text{(Equation 8)}$$

$$\pm\Delta_l/2, \pm 3\Delta_l/2, \ldots, \pm(Q_l-1)\Delta_l/2 \quad \text{(Equation 9)}$$

Here, the quantization interval $\Delta_l$ is determined as a value for minimizing a distortion value $D_{Q_l}$ (or a second distortion value).

$$D_{Q_l} = E\left[ \{\text{Re}(h_{k,m}[l]) - \text{Re}(\hat{h}_{k,m}[l])\}^2 \right] \quad \text{(Equation 10)}$$

$$= 2\sum_{i=0}^{Q_l/2-2} \int_{i\Delta_l}^{(i+1)\Delta_l} \left(\eta - i\Delta_l - \frac{\Delta_l}{2}\right)^2 f(\eta) d\eta +$$

$$2\int_{(Q_l-2)\frac{\Delta_l}{2}}^{\infty} \left(\eta - (Q_l-1)\frac{\Delta_l}{2}\right)^2 f(\eta) d\eta$$

Here, Re(x) is a real part of the complex number x. Further, f(η) is a probability density function of $\text{Re}(h_{k,m}[l])$, and is given as $$f(\eta) = \frac{1}{\sqrt{\pi \sigma_l^2}} e^{-\frac{\eta^2}{\sigma_l^2}}$$

in the case of a Rayleigh fading channel.

As described above, while the quantization level $Q_l$ is fixed as $Q_l = 2^{\lfloor B_l/2 \rfloor}$, $\Delta_l$ for minimizing Equation 10 is found. In order to further improve the quantization performance, it is possible to simultaneously find $\Delta_l$ and $Q_l$ (i.e., $B_l$) and use them so as to minimize Equation 10 without fixing the quantization level. In this case, the minimization must be solved by adding a condition of Equation 11.

$$2\sum_{l=0}^{L-1} \lfloor B_l/2 \rfloor = B_{total} \quad \text{(Equation 11)}$$

Here, $B_{total}$ represents the number of entire quantization bits that are allocated for quantizing the channel coefficients between a base station antenna and a terminal.

In this given state, there is no closed form value of $\Delta_l$ for minimizing Equation 10 or $Q_l$ and $\Delta_l$ for minimizing Equation 10 within the condition of Equation 11. However, these values can be computed according to various numerical methods.

A method for a terminal to quantize a coefficient value through the structure of the communication system described with reference to FIG. 1 will now be described with reference to FIG. 2.

Figure 2:
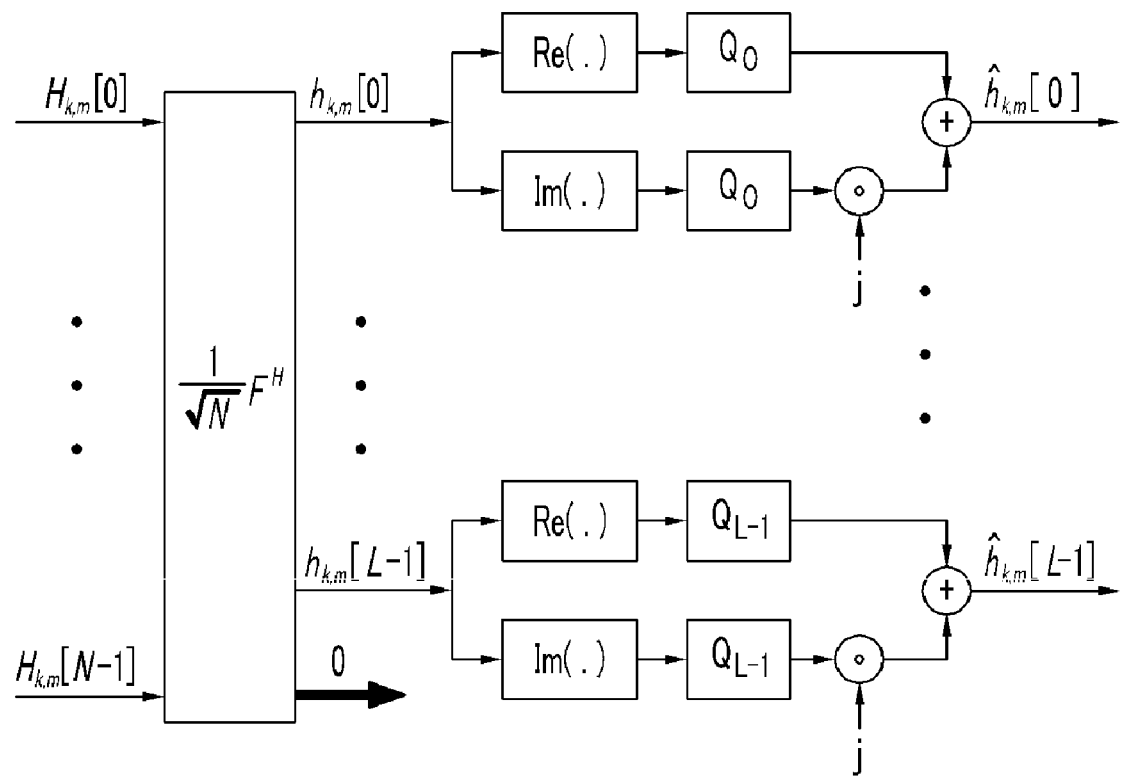
FIG. 2 shows a method for quantizing a time domain channel coefficient according to an exemplary embodiment of the present invention.

FIG. 2 shows a method for quantizing a time domain channel coefficient according to an exemplary embodiment of the present invention.

The channel can be estimated in the time domain depending on the communication system, and the channel can be estimated in the frequency domain to apply an inverse fast Fourier transform (IFFT) on the estimated frequency domain channel coefficient and acquire a channel coefficient in the time domain. As shown in FIG. 2, the channel is estimated in the frequency domain and an IFFT is applied to the estimated frequency domain coefficient to acquire a channel value in the time domain in the exemplary embodiment of the present invention, but is not restricted thereto.

An IFFT $$\left( \frac{1}{\sqrt{N}} F^H \right)$$

is applied to the frequency domain channel coefficient $H_{k,m}[0], \ldots, H_{k,m}[N-1]$ to acquire a time domain channel coefficient $h_{k,m}[0], \ldots, h_{k,m}[L-1]$. A real part and an imaginary part of the path gain are respectively quantized for each path, and the quantized values $\hat{h}_{k,m}[0], \ldots, \hat{h}_{k,m}[L-1]$ are transmitted to the base station.

A method for a terminal to quantize a channel state value and transmit a channel state value to the base station through the method described with reference to FIG. 2 will now be described with reference to FIG. 3.

Figure 3:
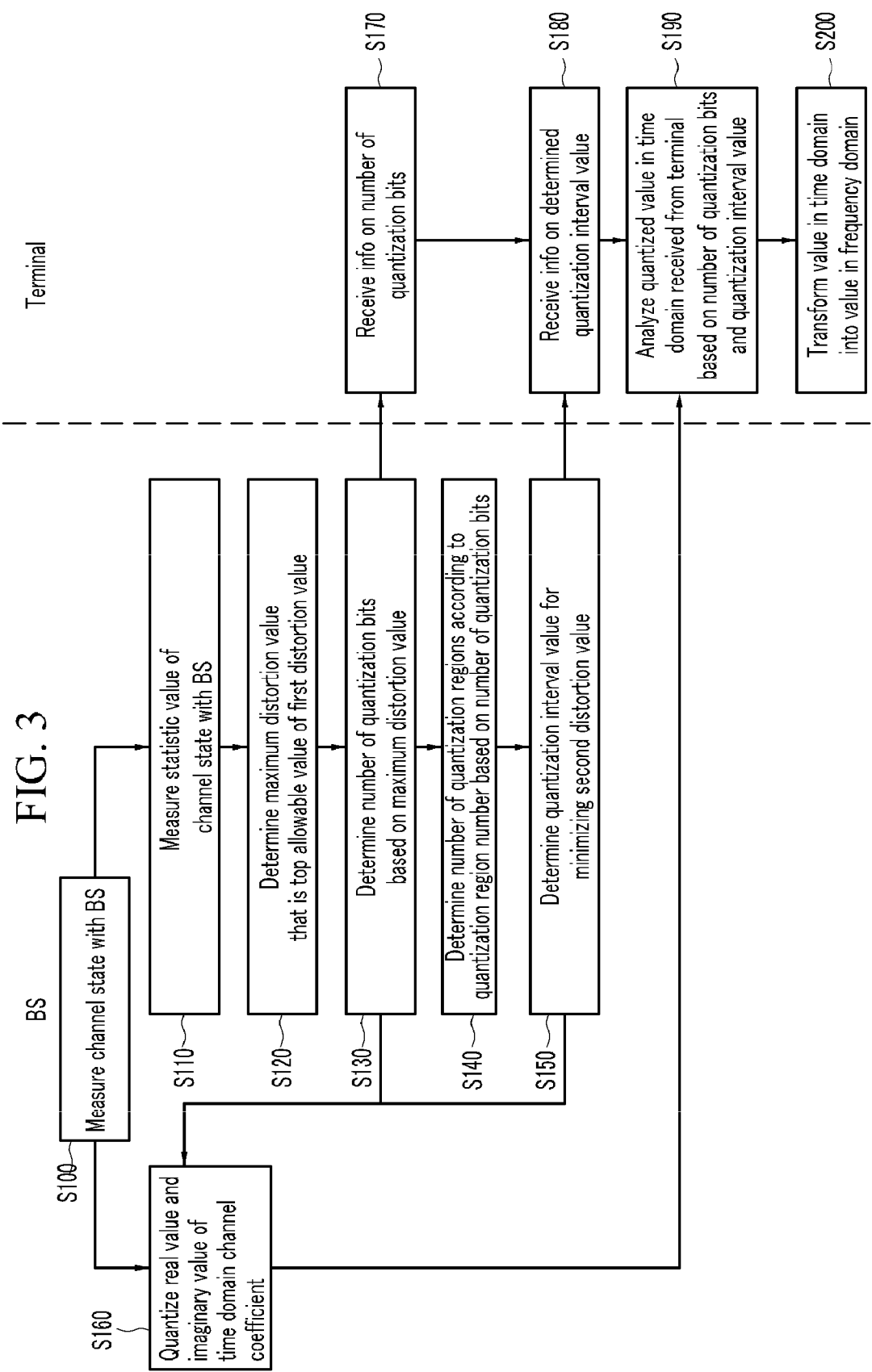
FIG. 3 shows a flowchart for a channel state value transmitting method according to an exemplary embodiment of the present invention.

FIG. 3 shows a flowchart for a channel state value transmitting method according to an exemplary embodiment of the present invention.

As shown in FIG. 3, the terminal measures the channel state in the time domain with the base station to which the terminal is connected (S100). The channel state estimated in (S100) can be used for two cases, that is, it can be used for quantizing the real value and the imaginary value of the time domain channel coefficient, and it can also be used for measuring statistic values of the base station and the channel state. The two cases are respectively performed in parallel in FIG. 3, and are not restricted to this.

The terminal measures a statistic value of the channel state with the base station, that is, a variance value by using the channel state measured in the time domain (S110). The terminal sets an allowable value for the quantization error, that is, the maximum distortion value D, as a value that is not to be exceeded by a first distortion value (S120), and determines the number of quantization bits based on the maximum distortion value and the statistic value of the channel state (S130). In this instance, the number of quantization bits is determined to be not greater than the maximum allowable value D of the first distortion value according to the rate distortion function.

The number of quantization bits determined in S130 is transmitted to the base station, and the terminal is used to quantize the real value and the imaginary value of the time domain channel coefficient. Based on the number of quantization bits determined in S130, the terminal determines the quantization interval value for maximizing quantization performance (S150).

For this purpose, the number of quantization regions according to the quantization region number is determined based on the number of quantization bits (S140). A quantization interval value for minimizing a second distortion value is determined (S150). The quantization interval value determined in S150 is transmitted to the base station in a like manner of the number of quantization bits, and is used for the terminal to quantize a real value and an imaginary value of the time domain channel coefficient. In this instance, in S130 and S150, the terminal intermittently transmits the number of quantization bits and quantization interval information to the base station when the statistic characteristic of the channel is changed or according to a predetermined period.

The quantization interval value is determined so as to minimize the second distortion value in the case of uniform scalar quantization in the exemplary embodiment of the present invention, but it is not restricted thereto. Also, the number of quantization bits and the quantization interval value determined in S130 and S150 can be determined so as to increase quantization performance simultaneously rather than sequentially. The quantization interval value and the quantization bit value are elements for configuring a quantization set, and are used for quantizing the channel coefficient.

When the number of quantization bits and the quantization interval value are determined as described above, the terminal quantizes the channel coefficient by using the quantization interval value and the quantization bit value (S160). The quantized value is transmitted to base station, and the terminal analyzes the quantized value S190 based on the number of quantization bits determined and transmitted through S130 and S150 and the quantization interval value S170 and S180. The value in the time domain is transformed into a value in the frequency domain (S200) to acquire a channel state in the frequency domain.

A method for the base station having received the quantized value from the terminal in S200 through FIG. 2 and FIG. 3 to compute the frequency domain coefficient will now be described with reference to FIG. 4.

Figure 4:
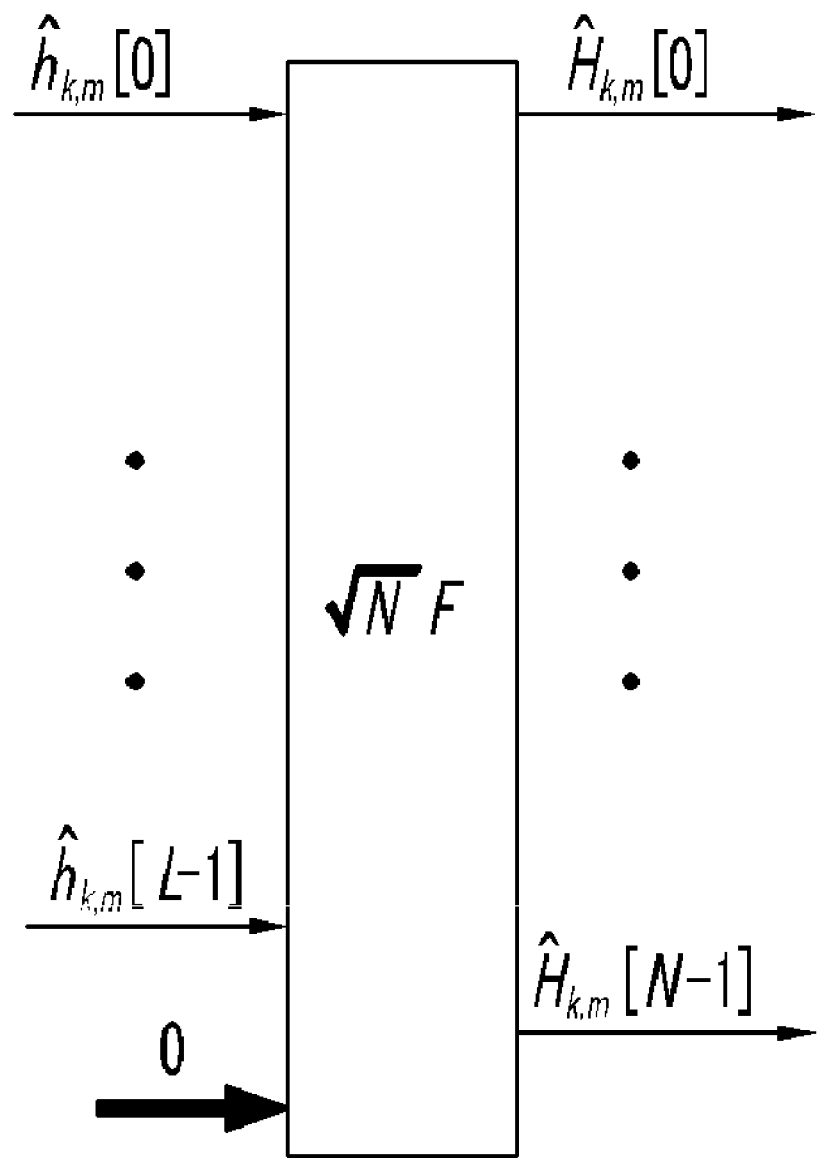
FIG. 4 shows a method for computing a frequency domain channel coefficient from a quantized time domain channel coefficient according to an exemplary embodiment of the present invention.

FIG. 4 shows a method for computing a frequency domain channel coefficient from a quantized time domain channel coefficient according to an exemplary embodiment of the present invention.

As shown in FIG. 4, when the quantized time domain channel coefficient $\hat{h}_{k,m}[0], \ldots, \hat{h}_{k,m}[L-1]$ is received from each terminal connected to the base station, the fast Fourier transform ($\sqrt{N}F$) is performed to acquire the frequency domain channel coefficient $H_{k,m}[0], \ldots, H_{k,m}[N-1]$. Here, since the method for fast Fourier transforming the time domain channel coefficient $\hat{h}_{k,m}[0], \ldots, \hat{h}_{k,m}[L-1]$ is well known to a person skilled in the art, no detailed description will be provided in the exemplary embodiment of the present invention.

The important point when channel state information is transmitted from the terminal to the base station is to provide sufficient channel state information so that the base station may generate multiple beams with less interference while as little as possible of the communication resource from the terminal to the base station is used. Therefore, since the terminal transmits the channel value in the time domain to the base station for the purpose of the channel state information in the exemplary embodiment of the present invention, greater efficiency is acquired compared to the case of transmitting the channel value in the frequency domain.

Particularly, since it is required to transmit channel state information for each frequency bandwidth with a predetermined size in the case of transmitting the channel value in the frequency domain, the bandwidth for the terminal to transmit channel state information to the base station is linearly increased when the entire channel bandwidth is increased. However, when the terminal transmits the channel value in the time domain to the base station by using the method according to the exemplary embodiment of the present invention, the increase of the entire channel bandwidth is not influenced since the required bandwidth from the terminal to the base station is determined by the number of multipaths of the channel.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for a terminal to transmit channel state information with a base station to the base station, comprising:
measuring a channel state with the base station;
quantizing the measured channel state in the time domain;
including the quantized channel state information in a reference signal and transmitting the same to the base station; and
determining a plurality of quantization bits and determining a quantization interval value before the quantizing,
wherein the determining of the plurality of the quantization bits comprises determining a maximum distortion value that comprises a maximum allowable value for a first distortion value, and determining the plurality of the quantization bits based on the maximum distortion value, and
wherein the quantization interval value is determined to minimize a second distortion value.

2. The method of claim 1, wherein, in the quantizing, the plurality of quantization bits and a quantization region for each path gain are differently set according to a statistic characteristic of the path gain for each channel path.

3. The method of claim 2, wherein the quantizing includes:
respectively allocating the plurality of quantization bits according to the statistic characteristic of the path gain for each channel path; and
setting a quantization region based on the plurality of quantization bits.

4. The method of claim 3, wherein the respectively allocating the plurality of quantization bits further includes:
defining the first distortion value with an average value of a squared quantization error of the time domain channel coefficient; and
determining the plurality of quantization bits for quantizing a channel coefficient of a channel path that is needed for a case in which the first distortion value is less than a predetermined maximum distortion value.

5. The method of claim 3, wherein the setting of a quantization region includes:
determining a plurality of quantization regions based on the plurality of quantization bits;
uniformly setting the quantization interval value so as to minimize the second distortion value; and
finding a quantization boundary value and a middle value of the quantization region from the quantization interval value.

6. The method of claim 3, further including simultaneously finding the plurality of quantization bits and the quantization interval value for minimizing the second distortion value, and using the same as the plurality of quantization bits and the quantization interval value.

7. The method of claim 6, wherein the plurality of quantization bits and the quantization interval value are computed when the statistic characteristic of a path gain for each channel path is changed or for each predetermined period, and computed results are transmitted to the base station.

8. The method of claim 1, wherein the measuring of the channel state includes:
estimating a channel in the frequency domain; and
taking an inverse fast Fourier transform of a value of the estimated channel in the frequency domain to acquire a time domain channel coefficient.

9. A method for a base station receiving feedback information from a terminal to acquire a channel state from the base station to the terminal, comprising:
transmitting a reference signal to the terminal through a multipath communication channel;
receiving quantized channel state information in the time domain from the terminal;
checking a channel state in the frequency domain from the received channel state information in the time domain; and
determining a plurality of quantization bits and determining a quantization interval value before the quantizing,
wherein the determining of the plurality of the quantization bits comprises determining a maximum distortion value that comprises a maximum allowable value for a first distortion value, and determining the plurality of the quantization bits based on the maximum distortion value, and
wherein the quantization interval value is determined to minimize a second distortion value.

10. The method of claim 9, further including receiving the plurality of quantization bits and the quantization interval value of a path gain for each channel path from the base station when the channel state is changed or according to a predetermined period.

11. The method of claim 10, wherein the method includes receiving feedback information including quantized channel state information in the time domain from the terminal, analyzing the feedback information based on the plurality of quantization bits and the quantization interval value of the path gain for each channel path, and acquiring quantized time domain channel state information.

12. The method of claim 1, wherein the method further comprises determining a plurality of quantization regions based on the plurality of quantization bits, before the quantizing.

\* \* \* \* \*